(12) United States Patent
Tamura

(10) Patent No.: US 6,933,045 B2
(45) Date of Patent: Aug. 23, 2005

(54) HEAT-RESISTANT GLASS FIBER AND PROCESS FOR THE PRODUCTION THEREOF

(75) Inventor: Shinichi Tamura, Fukushima (JP)

(73) Assignee: Nitto Boseki Co., Ltd., Fukushima-ken (JP)

( * ) Notice: Subject to any disclaimer, the term of this patent is extended or adjusted under 35 U.S.C. 154(b) by 0 days.

(21) Appl. No.: 09/766,318

(22) Filed: Jan. 19, 2001

(65) Prior Publication Data

US 2001/0011058 A1 Aug. 2, 2001

(30) Foreign Application Priority Data

Jan. 21, 2000 (JP) ........................................ 2000-013089

(51) Int. Cl.$^7$ .......................... C03C 13/00; C04B 35/00; D02G 3/00
(52) U.S. Cl. .......................... 428/364; 428/375; 501/35; 501/95.1
(58) Field of Search ................................ 428/374, 357, 428/387, 388, 375, 392; 501/35, 53, 95.1, 36

(56) References Cited

U.S. PATENT DOCUMENTS

| | | | |
|---|---|---|---|
| 2,334,961 A | 11/1943 | Schoenlaub | |
| 3,402,055 A | 9/1968 | Harris et al. | |
| 3,847,626 A | * 11/1974 | Erickson et al. | ............... 106/50 |
| 3,847,627 A | 11/1974 | Erickson et al. | |
| 4,542,106 A | * 9/1985 | Sproull | ......................... 501/38 |
| 5,789,329 A | 8/1998 | Eastes et al. | |

FOREIGN PATENT DOCUMENTS

JP 5-147975 6/1993

* cited by examiner

*Primary Examiner*—Rena Dye
*Assistant Examiner*—Lawrence Ferguson
(74) *Attorney, Agent, or Firm*—Nixon & Vanderhye P.C.

(57) ABSTRACT

Provided are a heat-resistant glass fiber which has excellent heat resistance, which is also easy to spin and less expensive and which is suitable as an acoustic material for use in an automobile muffler, and a process for the production thereof. The heat-resistant glass fiber has a composition comprising, substantially by weight %, 56 to 58.5% of $SiO_2$, 12 to 17% of $Al_2O_3$, 16 to 27% of CaO, 1 to 9% of MgO, 0 to 1% of $Na_2O$ and 0 to 1% of $K_2O$ as the entirety of the fiber and containing neither $B_2O_3$ nor $F_2$, and has a surface layer portion made of a silicic glass having an $SiO_2$ content of at least 90% by weight. The process comprises treating the surface of the above fiber having the above composition with a mineral acid, to produce the heat-resistant glass fiber.

6 Claims, No Drawings

HEAT-RESISTANT GLASS FIBER AND PROCESS FOR THE PRODUCTION THEREOF

FIELD OF THE INVENTION

The present invention relates to a heat-resistant glass fiber and a process for the production thereof. More specifically, it relates to a heat-resistant glass fiber which is suitable for use in an automobile muffler, etc., and which is excellent in heat resistance, easy to produce by spinning and less expensive, and a process for efficiently producing the above fiber.

PRIOR ART OF THE INVENTION

An automobile muffler is a part for absorbing an exhaust noise, and it is present practice to use a glass fiber as an acoustic material therefor. However, recent high energy-saving of an automobile engine and recent regulations of exhaust fumes cause an engine temperature to increase, and the temperature of an exhaust gas in a muffler portion comes to be 700° C. or higher under present circumstances. And, it is said that the exhaust gas temperature in a muffler portion comes to be 850° C. or higher in the year of 2002 when severer exhaust gas regulations will be introduced in Japan. It is therefore an urgent need to develop a higher heat-resistant acoustic material usable (at e.g. 900° C.) in the muffler.

As a heat-resistant glass fiber, a glass fiber obtained by treating an E glass fiber with an acid is known (JP-A-5-147975). This glass is obtained by immersing a general E glass fiber containing 50 to 63% by weight of $SiO_2$, 12 to 16% by weight of $Al_2O_3$, 8 to 13% by weight of $B_2O_3$, 15 to 20% by weight of CaO+MgO and a trace amount of $Na_2O+K_2O$, in hydrochloric acid having a concentration of e.g. 9~12% by weight at 40 to 70° C. for approximately 30 minutes to several hours. In the immersing treatment, the surface layer portion of the E glass fiber is converted to a silicic glass, so that the E glass fiber is imparted with heat resistance.

The above acid-treated E glass fiber has advantages that the spinning temperature and the liquidus temperature thereof differ to a great extent so that the production thereof by spinning is easy and that it is less expensive. However, it has insufficient heat resistance as an acoustic material for use in a muffler portion where an exhaust gas has a temperature of 850° C. or higher, and it cannot be readily used.

For this reason, it is thinkable to use an S glass fiber having high heat resistance as an acoustic material. However, the S glass is very expensive.

SUMMARY OF THE INVENTION

Under the circumstances, it is an object of the present invention to provide a heat-resistant glass fiber which has excellent heat resistance, which is also easy to produce by spinning and less expensive and which is suitable as an acoustic material for use in an automobile muffler portion where an exhaust gas has a temperature of 850° C. or higher.

For developing a heat-resistant glass fiber having the above desirable properties, the present inventors have made diligent studies. As a result, it has come into the notice of the present inventors that, for improving an acid-treated glass fiber in heat resistance, there is required a glass having a high softening point before the acid treatment and having a composition feasible for making it easy to carry out the acid treatment, and it has been found that a glass having a specific composition has a higher softening point than the E glass, is easy to produce by spinning, is easy to treat with acid and is less expensive. Further it has been found that the above object can be achieved by treating a fiber made of the above glass with a mineral acid. The present invention has been accordingly completed on the basis of the above findings.

That is, according to the present invention, there is provided a heat-resistant glass fiber which has a composition comprising, substantially by weight %, 56 to 58.5% of $SiO_2$, 12 to 17% of $Al_2O_3$, 16 to 27% of CaO, 1 to 9% of MgO, 0 to 1% of $Na_2O$ and 0 to 1% of $K_2O$ as the entirety of the fiber and containing neither $B_2O_3$ nor $F_2$, and which has a surface layer portion made of a silicic glass having an $SiO_2$ content of at least 90% by weight.

According to the present invention, there is also provided a process for the production of the above heat-resistant glass fiber, which comprises treating the surface of a glass fiber which has a composition comprising, by weight %, 56 to 58.5% of $SiO_2$, 12 to 17% of $Al_2O_3$, 16 to 27% of CaO, 1 to 9% of MgO, 0 to 1% of $Na_2O$ and 0 to 1% of $K_2O$ and containing neither $B_2O_3$ nor $F_2$, with a mineral acid.

DETAILED DESCRIPTION OF THE INVENTION

In the heat-resistant glass fiber of the present invention, the surface layer portion of a glass fiber which has a composition comprising, by weight %, 56 to 58.5% of $SiO_2$, 12 to 17% of $Al_2O_3$, 16 to 27% of CaO, 1 to 9% of MgO, 0 to 1% of $Na_2O$ and 0 to 1% of $K_2O$ and containing neither $B_2O_3$ nor $F_2$ (the glass fiber will be referred to as "glass fiber before modification" hereinafter) is modified into a silicic glass having an $SiO_2$ content of at least 90% by weight, and the glass composition of the heat-resistant glass fiber as the entirety of the fiber is substantially the same as the above-specified composition.

In the above glass fiber, $SiO_2$ is a component for improving the glass in heat resistance. When the content thereof in the glass fiber before modification is less than 56% by weight, the glass does not exhibit any sufficient heat resistance. When it exceeds 58.5% by weight, the glass come to have a high melting temperature, so that the spinnability thereof is poor, and acid treatment to be described later is difficult.

$Al_2O_3$ is a component for improving the water resistance of the glass and decreasing the liquidus temperature thereof. When the content thereof in the glass fiber before modification is less than 12% by weight or more than 17% by weight, the glass comes to have a high liquidus temperature, so that the spinnability thereof is poor.

CaO is a component for improving the water resistance of the glass, decreasing the viscosity of the glass and improving the meltability thereof. When the content thereof in the glass fiber before modification is less than 16% by weight, the glass has too high a melting temperature. When it exceeds 27% by weight, the glass has a high liquidus temperature, so that the spinnability thereof is poor.

MgO is a component for decreasing the viscosity of the glass and improving the meltability of the glass. When the content thereof in the glass fiber before modification is less than 1% by weight or more than 9% by weight, the glass comes to have a high liquidus temperature, so that the spinnability thereof is poor.

$Na_2O$ and $K_2O$ are components for decreasing the viscosity of the glass and the improving the meltability thereof. The content of each in the glass fiber before modification is in the range of from 0 to 1% by weight. When the total content of these components exceeds 2% by weight, the glass is liable to have poor heat resistance.

In addition to the above components, the glass fiber of the present invention may contain components such as $Fe_2O_3$, $TiO_2$, SrO, etc., which are included as impurities from raw materials, may contain components such as $Cr_2O_3$, $ZrO_2$, etc., which are derived from erosion of a refractory material, and further may contain components such as ZnO, $MnO_2$, BaO, $P_2O_5$, and the like, so long as the object of the present invention is not impaired. Generally, the total content of the above components in the glass fiber before modification is 1.5% by weight or less. However, the glass fiber of the present invention does not contain any one of $B_2O_3$ and $F_2$.

In the glass fiber of the present invention, the softening point of the glass fiber before modification is generally 850° C. or higher, preferably 880° C. or higher. Incidentally, E glass generally has a softening point of approximately 840° C. Further, the difference $\Delta T$ between the spinning temperature (melting temperature of a glass having a viscosity of 100 Pa·s (Pascal·second)) and the liquidus temperature thereof is generally at least 30° C. The above $\Delta T$ is a measure for determining spinnability. When the value thereof is less than 30° C., undesirably, the spinnability is poor.

Even when a certain portion of a glass in a furnace reaches a temperature set at a predetermined temperature, the temperature of a portion of the glass which is on the wall side of the furnace is often lower than the predetermined temperature. In this case, when the temperature of a molten glass comes to be lower than the liquidus temperature thereof as the molten glass having a temperature lower than the predetermined temperature comes toward a bushing of a spinning apparatus, the glass is partly devitrified and a spun fiber is liable to break. Therefore, with an increase in the $\Delta T$, the spinning is easier. In the present invention, particularly preferably, the $\Delta T$ is at least 50° C.

Further, the liquidus temperature is generally in the range of from 1,160 to 1,230° C., and the spinning temperature is generally in the range of from 1,230 to 1,280° C.

The glass fiber of the present invention has a characteristic feature in that the surface layer portion thereof is made of a silicic glass having an $SiO_2$ content of at least 90% by weight. When the $SiO_2$ content in the surface layer portion is less than 90% by weight, no desired heat resistance can be attained. Preferably, the surface layer portion having an $SiO_2$ content of at least 90% by weight has a thickness in the range of from 0.1 to 1.0 $\mu$m. When the thickness of the surface layer portion is less than 0.1 $\mu$m, the heat resistance may not be fully exhibited. When it exceeds 1.0 $\mu$m, the shrinkage factor of the surface layer portion and the shrinkage factor of an inner layer portion differs to a great extent, which causes the surface layer portion to crack.

Although differing depending upon fields of use, the average diameter of the glass fiber of the present invention is generally in the range of from 9 to 24 $\mu$m, preferably 9 to 18 $\mu$m.

While the method of the glass fiber of the present invention may be any method and is not specially limited so long as a glass fiber having the above properties can be obtained, the glass fiber of the present invention can be efficiently produced by the following method of the present invention.

In the method of the present invention, according to a conventional method, there is prepared a glass fiber which has a composition comprising, by weight %, 56 to 58.5% of $SiO_2$, 12 to 17% of $Al_2O_3$, 16 to 27% of CaO, 1 to 9% of MgO, 0 to 1% of $Na_2O$ and 0 to 1% of $K_2O$ and containing neither $B_2O_3$ nor $F_2$ and which has an average diameter of 9 to 24 $\mu$m, preferably 9 to 18 $\mu$m.

Then, the surface of the above glass fiber is treated with a mineral acid, to elute components other than silica, such as alkaline earth metals, alkali metals, alumina, etc., present on and near a fiber surface, and then, the glass fiber is washed with water and dried under heat.

The above acid treatment is generally carried out by immersing the above glass fiber in an aqueous solution of at least one acid selected from HCl, $H_2SO_4$ or $HNO_3$, preferably an aqueous solution containing 1 to 10% by weight of HCl. The above aqueous solution preferably has a temperature in the range of from 0 to 90° C., more preferably 20 to 80° C. When the above temperature is lower than 0° C., impractically, the acid treatment rate is too low. When it is higher than 90° C., it is undesirable in view of workability. The time period for the acid treatment cannot be uniformly determined and it differs depending upon a concentration of the aqueous solution containing a mineral acid or a treatment temperature. Generally, however, it is sufficient to carry out the acid treatment for 5 minutes to 5 hours.

By the above acid treatment, the glass fiber comes to have an approximately 0.1 to 1.0 $\mu$m thick surface layer portion made of a silicic glass having an $SiO_2$ content of at least 90% by weight, and the resultant glass fiber has heat resistance against a high temperature of at least 850° C. The surface layer portion made of the silicic glass formed by the above acid treatment is generally porous, and the composition of the surface layer portion can be analyzed by means of a photoelectron spectrometer.

EXAMPLES

The present invention will be explained more in detail with reference to Examples hereinafter, while the present invention shall not at all be limited by these Examples.

Glass before spinning and a glass fiber were measured for various properties according to the following methods.

<Properties of Glass Before Spinning>

(1) Spinning Temperature

A sample before spinning was measured for a spinning temperature (melting temperature of glass having a viscosity of 100 Pa·s) with a high-temperature rotary viscometer.

(2) Liquidus Temperature

A glass sample before spinning was milled into a powder having a diameter of approximately 500 to 1,000 $\mu$m, and the powder was placed in a platinum boat. The boat with the powder in it was placed in a furnace having a temperature gradient, held for 12 hours and then taken out. The sample taken out was measured for a liquidus temperature (temperature at or over which no crystal was present in the glass) according to a method in which a site where devitrification took place was observed through a microscope.

(3) $\Delta T$

A difference between the spinning temperature in the above (1) and the liquidus temperature in the above (2) was defined to be a $\Delta T$.

(4) Softening Point

Measured according to JIS R 3104 "Measurement method of softening point of glass".

<Properties of Glass Fiber>

(5) Acid Treatment Properties

Two grams of a glass fiber before acid treatment was immersed in 200 milliliters of 3 wt % hydrochloric acid at 70° C. for 45 minutes and then measured for a weight loss ratio, to evaluate acid treatment properties.

(6) Heat Resistance

An acid-treated glass fiber was placed on a mat made of an alumina fiber and then heated in an electric furnace at 900° C. for 10 hours. Then, the glass fiber was observed for a change, and the heat resistance thereof was evaluated on the basis of the following ratings.

AA: A fiber nearly retains its flexibility.

A: A fiber loses its flexibility almost by half.

B: A fiber retains its form but lost almost all of its flexibility.

C: Fibers are fused and deformed.

(7) Loss Ratio After Heating

An acid-treated fiber was measured for weights before and after it was heated at 850° C. for 1 hour, to calculate a weight difference, and a weight loss ratio (%) after heating was determined on the basis of the weight difference.

(8) Thickness of Surface Layer Portion Having SiO$_2$ Content of at Least 90% by Weight A value calculated on the basis of the following expression using a weight loss ratio obtained in the above (7) was defined to be "a thickness of a surface layer portion having an SiO$_2$ content of at least 90% by weight".

Thickness of surface layer portion=fiber diameter before acid treatment×(1−(1−weight loss ratio after heating×0.66)$^{0.5}$)

Examples 1–5 and Comparative Examples 1–6

Raw materials for glasses were formulated to obtain compositions shown in Tables 1 and 2, and in each Example, the formulated raw materials were melted in a platinum crucible at 1,500° C. for 8 hours. Then, molten glasses were cast on carbon plates to obtain glass samples. Tables 1 and 2 show spinning temperatures, liquidus temperatures, ΔT and softening points of the glass samples.

Then, glass fibers having an average diameter of 13 μm were spun from the above glass samples according to a conventional method. Tables 1 and 2 show acid treatment properties of the glass fibers.

Then, the above glass fibers were immersed in a 3 wt % hydrochloric acid at 70° C. for 45 minutes, and the thus-treated glass fibers were washed with water and dried to obtain acid-treated glass fibers. Tables 1 and 2 show heat resistance of each of these acid-treated glass fibers and thickness of the surface layer portion of each acid-treated glass fiber which surface layer portion had an SiO$_2$ content of at least 90% by weight.

Comparative Example 1 shows a glass composition of E glass (U.S. Pat. No. 2,334,961), Comparative Example 2 shows a glass composition of ECR glass (U.S. Pat. No. 3,847,627), Comparative Example 3 shows a glass composition of a glass disclosed in U.S. Pat. No. 5,789,329, and Comparative Example 4 shows a glass composition of an S glass (U.S. Pat. No. 3,402,055).

Comparative Examples 5 and 6 show glass compositions containing the same components as the glass components used in the present invention. However, the contents of some components are outside their ranges defined in the present invention.

TABLE 1

| | Example | | | | |
|---|---|---|---|---|---|
| | 1 | 2 | 3 | 4 | 5 |
| Glass Composition (wt %) | | | | | |
| SiO$_2$ | 58.0 | 57.7 | 57.5 | 58.0 | 57.7 |
| B$_2$O$_3$ | — | — | — | — | — |
| Al$_2$O$_3$ | 16.0 | 13.5 | 14.3 | 13.0 | 15.0 |
| CaO | 16.7 | 25.3 | 25.2 | 25.4 | 24.0 |
| MgO | 8.3 | 3.0 | 2.8 | 3.0 | 2.8 |
| Na$_2$O | 0.0 | 0.0 | 0.0 | 0.0 | 0.0 |
| K$_2$O | 1.0 | 0.5 | 0.5 | 0.6 | 0.5 |
| Fe$_2$O$_3$ | 0.0 | 0.0 | 0.0 | 0.0 | 0.0 |
| TiO$_2$ | — | — | — | — | — |
| ZnO | — | — | — | — | — |
| Glass Properties | | | | | |
| Spinning temperature (° C.) | 1,227 | 1,246 | 1,242 | 1,246 | 1,262 |
| Liquidus temperature (° C.) | 1,170 | 1,174 | 1,181 | 1,188 | 1,200 |
| ΔT (° C.) | 57 | 72 | 61 | 58 | 62 |
| Softening point (° C.) | 915 | 887 | 885 | 890 | 902 |
| Properties of glass fibers | | | | | |
| Acid treatment properties[1] (%) | 6.0 | 7.0 | 9.0 | 6.0 | 7.0 |
| Loss ratio after heating (%) | 12 | 14 | 18 | 12 | 14 |
| Thickness of surface layer portion[2] (μm) | 0.64 | 0.75 | 0.98 | 0.60 | 0.70 |
| Heat resistance (900° C., 10 hours) | AA | AA | AA | AA | AA |

(Notes)
[1] Acid treatment properties: shown by a weight loss ratio based on acid treatment.
[2] Thickness of surface layer portion: thickness of a surface layer portion having an SiO$_2$ conent of at least 90% by weight.

TABLE 2

| | | Comparative Example | | | | | |
|---|---|---|---|---|---|---|---|
| | | 1 | 2 | 3 | 4 | 5 | 6 |
| Glass Composition (wt %) | SiO$_2$ | 54.6 | 59.0 | 60.0 | 65.0 | 57.5 | 57.8 |
| | B$_2$O$_3$ | 7.0 | — | — | — | — | — |
| | Al$_2$O$_3$ | 14.3 | 12.0 | 12.9 | 25.0 | 14.0 | 17.5 |
| | CaO | 22.3 | 21.5 | 23.1 | — | 27.5 | 16.1 |
| | MgO | 0.8 | 2.8 | 3.0 | 10.0 | 0.4 | 8.1 |
| | Na$_2$O | 0.3 | 0.2 | 0.0 | 0.0 | 0.0 | 0.0 |
| | K$_2$O | 0.3 | 0.2 | 0.6 | — | 0.5 | 0.5 |
| | Fe$_2$O$_3$ | 0.2 | 0.2 | 0.3 | — | 0.1 | 0.0 |
| | TiO$_2$ | 0.2 | 2.0 | 0.1 | — | — | — |
| | ZnO | — | 2.1 | — | — | — | — |

TABLE 2-continued

| | | Comparative Example | | | | | |
|---|---|---|---|---|---|---|---|
| | | 1 | 2 | 3 | 4 | 5 | 6 |
| Glass Properties | Spinning temperature (° C.) | 1,200 | 1,250 | 1,278 | 1,480 | 1,250 | 1,291 |
| | Liquidus temperature (° C.) | 1,070 | 1,160 | 1,192 | 1,474 | 1,249 | 1,270 |
| | ΔT (° C.) | 130 | 90 | 86 | 6 | 1 | 21 |
| | Softening point (° C.) | 840 | 890 | 916 | 1,050 | 895 | 930 |
| Properties of glass fibers | Acid treatment properties[1] (%) | 12.0 | 0.2 | 0.4 | 0.1 | 8.7 | 6.0 |
| | Loss ratio after heating (%) | 24 | 0.4 | 0.8 | 0.2 | 17 | 12 |
| | Thickness of surface layer portion[2] (μm) | 1.40 | 0.02 | 0.04 | 0.01 | 0.92 | 0.64 |
| | Heat resistance (900° C., 10 hours) | B | C | C | A | AA | AA |

(Notes)
[1]Acid treatment properties: shown by a weight loss ratio based on acid treatment.
[2]Thickness of surface layer portion: thickness of a surface layer portion having an $SiO_2$ content of at least 90% by weight.

As is seen from Tables 1 and 2, in all of Examples 1 to 5, the ΔT is at least 50° C. so that the glasses are excellent in spinnability, and further, the glass fibers are excellent in acid treatment properties and have 0.60 to 0.98 μm thick surface layer portions made of silicic glass (having an $SiO_2$ content of at least 90% by weight), so that they have excellent heat resistance.

In Comparative Example 1, the glass has a composition of E glass and is excellent in spinnability. The glass fiber is excellent is acid treatment properties and its surface layer portion made of a silicic glass has a thickness of as large as 1.40 μm. However, the softening temperature before acid treatment is 840° C., which is considerably low as compared with the softening points (885 to 915° C.) in Examples 1 to 5. As a result, the glass fiber is poor in heat resistance as compared with the glass fibers in Examples 1 to 5.

In Comparative Example 2, the glass has a composition of ECR glass (corrosion resistant glass) and has good spinnability. However, the glass fiber is poor in acid treatment properties, and since the surface layer portion made of a silicic glass has a thickness of as small as 0.02 μm, the glass fiber is very poor in heat resistance.

In Comparative Example 3, the glass has a high $SiO_2$ content and is excellent in spinnability. However, the glass fiber is poor in acid treatment properties, and since the surface layer portion made of a silicic glass has a thickness of as small as 0.04 μm, the glass fiber is very poor in heat resistance.

In Comparative Example 4, the glass has a composition of S glass and has poor spinnability, and the glass fiber is poor in acid treatment properties. The surface layer portion made of a silicic glass has a thickness of as small as 0.01 μm, so that almost no effect produced by the acid treatment is observed. However, since the glass has a softening point of as high as 1,050° C., the glass fiber has relatively good heat resistance.

In Comparative Examples 5 and 6, the glass fibers are excellent in acid treatment properties, their surface layer portions made of silicic glass have a large thickness, and the glass fibers are excellent in heat resistance. Since, however, the ΔT is small, the glasses are poor in spinnability.

According to the present invention, there can be obtained a heat-resistant glass fiber which has excellent heat resistance, can be easily spun and can be suitably used as an acoustic material for use in an automobile muffler portion where an exhaust gas has a temperature of 850° C. or higher.

In the heat-resistant glass fiber of the present invention, further, the total content of $SiO_2$ and $Al_2O_3$ in the entire fiber is 82% by weight or less, so that the glass fiber is free from a carcinogenesis problem. Further, since no harmful or expensive materials are used, the glass fiber is almost free from causing environmental pollutions and is less expensive.

What is claimed is:

1. A heat-resistant glass fiber which has a composition consisting of, by weight %, 56 to 58.5% of $SiO_2$, 12 to 17% of $Al_2O_3$, 16 to 27% of CaO, 1 to 9% of MgO, 0 to 1% of $Na_2O$ and 0 to 1% of $K_2O$ as the entirety of the fiber and containing neither $B_2O_3$ nor $F_2$, and which has a surface layer portion made of a silicic glass having an $SiO_2$ content of at least 90% by weight, wherein the fiber substantially retains its flexibility when heated for ten hours at 900° C.

2. The heat-resistant glass fiber of claim 1, wherein the surface layer portion made of a silicic glass having an $SiO_2$ content of at least 90% by weight has a thickness of 0.1 to 1.0 μm.

3. The heat-resistant glass fiber of claim 1, wherein a difference ΔT between a spinning temperature which is a melting temperature of a glass having a viscosity of 100 Pa·s and a liqluidus temperature is at least 30° C.

4. A process for the production of the heat-resistant glass fiber recited in claim 1, which comprises treating the surface of a glass fiber which has a composition comprising, by weight %, 56 to 58.5% of $SiO_2$, 12 to 17% of $Al_2O_3$, 16 to 27% of CaO, 1% to 9% MgO, 0 to 1% of $Na_2O$ and 0 to 1% of $K_2O$ and containing neither $B_2O_3$ nor $F_2$, with a mineral acid.

5. The process of claim 4, wherein the treatment is carried out by immersing the glass fiber in an aqueous solution containing, as the mineral acid, 1 to 10% by weight of at least one acid selected from HCl, $H_2SO_4$ or $HNO_3$ at a temperature of 0 to 90° C.

6. A heat-resistant glass fiber which has a surface layer portion at least 0.01 μm thick, made of silicic glass having an $SiO_2$ content of at least 90%, the balance of the glass fiber having a composition consisting of, by weight %, 56 to 58.5% of $SiO_2$, 12 to 17% of $Al_2O_3$, 16 to 27% of CaO, 1 to 9% of MgO, 0 to 1% of $Na_2O$ and 0 to 1% of $K_2O$ as the entirety of the fiber and containing neither $B_2O_3$ nor $F_2$, wherein the fiber substantially retains its flexibility when heated for ten hours at 90 ° C.

* * * * *